United States Patent [19]
Orloff

[11] 3,868,322
[45] Feb. 25, 1975

[54] APPARATUS FOR PROVIDING A SUPPLY OF A FILTERED FLUID

[76] Inventor: George Orloff, 16 Heaton Rd., Solihull, Warwickshire, England

[22] Filed: July 23, 1973

[21] Appl. No.: 381,590

[30] Foreign Application Priority Data
July 21, 1972 Great Britain.................... 34167/72

[52] U.S. Cl................. 210/108, 137/835, 210/333, 210/340
[51] Int. Cl........................................... B01d 35/12
[58] Field of Search...... 137/835; 210/108, 82, 332, 210/333, 340; 137/835; 210/108, 82, 332, 333, 340

[56] References Cited
UNITED STATES PATENTS
3,016,066  1/1962  Warren.......................... 137/835 X
3,630,362  12/1971  Matthews....................... 210/333 X Primary Examiner—Frank A. Spear, Jr.
Attorney, Agent, or Firm—Holman & Stern

[57] ABSTRACT

An apparatus for providing a supply of filtered fluid comprises a bistable fluidic oscillator which provides a fluid flow alternately in a pair of passages. Filter chambers in the respective passages have auxiliary outlets which are interconnected via a restrictor network, whereby fluid flows in alternate directions through filter elements in the chambers, and filtered fluid from the restrictor network passes to the outlet.

4 Claims, 1 Drawing Figure

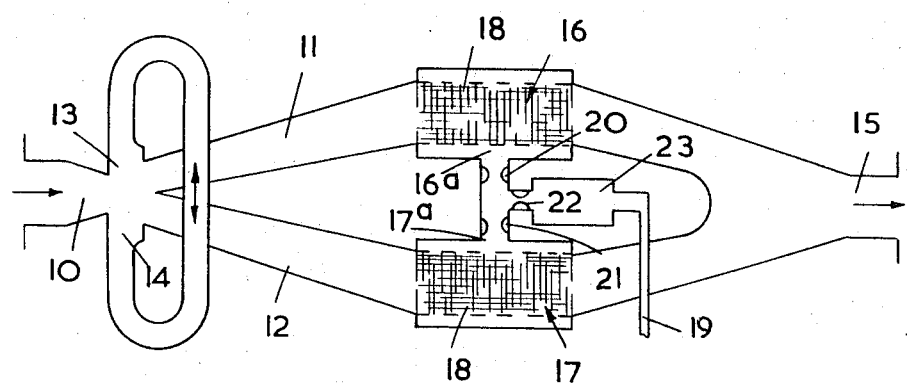

APPARATUS FOR PROVIDING A SUPPLY OF A FILTERED FLUID

This invention relates to apparatus for providing a supply of a filtered fluid.

An apparatus according to the invention comprises a fluidic oscillator which includes a bistable wall attachment effect device having a pair of outlet passages which are interconnected, a pair of filter chambers in said respective outlet passages, filter elements in said filter chambers, auxiliary outlets communicating with said filter chambers via said filter elements, a fluid flow restrictor network interconnecting said auxiliary outlets and a filtered fluid outlet communicating with said restrictor network, the arrangement being such that when the bistable device is in one stable state fluid flows from one filter chamber to the other filter chamber and to said filtered fluid outlet, and when the bistable device is in its other stable state fluid flows from said other chamber to said one chamber and to said filtered fluid outlet, whereby both filter elements are cleaned periodically.

An example of the invention is shown diagrammatically in the accompanying drawing.

The apparatus shown includes a fluid oscillator, which, as is known, can be constructed by connecting together the two control ports of a bistable wall attachment effect device and also connecting together the two outlets. In the drawing the device comprises an inlet nozzle 10 which opens at the junction of two inclined passages 11, 12. The control ports 13, 14 are arranged adjacent the nozzle 10 to deflect the jet therefrom when fluid issues from either port. Thus, in use a fluid pulse from the port 13 will deflect the jet into the passage 12 where it will remain by virtue of the wall attachment effect. Similarly a fluid pulse from the port 14 will deflect the jet into the passage 11.

The two passages 11, 12 are connected together and to a common outlet 15, via a pair of filter chambers 16, 17. Each such chamber includes a cylindrical or other filter element 18 along the control passage of which fluid can flow without obstruction. Fluid can, however, be drawn off through an auxiliary outlet 16a, 17a and such fluid must pass through the filter element 18. Ideally the filter element 18 is of zero thickness in which case it cannot be blocked by particles in the main fluid stream. In practice, of course, a zero thickness element is impossible and some particles will tend to collect on the element which will eventually become blocked.

The outlets 16a, 17a are connected together and to a fluid outlet 19 by a fluid flow restrictor network comprising two identical restrictors 20, 21 in series between the outlets 16a, 17a and a further restrictor 22 connecting the interconnection of the restrictors 20, 21 to the outlet 19 via a plenum chamber 23.

In use the flow from the nozzle 10 is switched between the passages 11 and 12 at a rate determined by the throughput. There will thus be a small difference in the pressures in the filter chambers 16, 17 and the direction of this difference will be reversed with each switching action. Because of this pressure difference there will be a flow of fluid alternatively from chamber 16 to chamber 17 and, from chamber 17 to chamber 16, through the restrictors 20, 21. Such flow will tend to keep the filter elements clear of particles.

In addition a supply of filtered fluid under pressure can be drawn as required from the outlet 19.

The apparatus described may be used in a gas turbine engine fuel system when it is required to draw off part of the flow of pressurised fuel to the engine burner, for use in a servo-mechanism which in turn controls the fuel flow.

I claim

1. An apparatus for providing a supply of filtered liquid, comprising a fluidic oscillator which includes a bistable wall attachment effect device having a pair of outlet passages and a pair of control ports, said control ports being interconnected so as to cause the bistable device to switch periodically between its two stable states at a rate determined by the fluid throughput, a pair of chambers in said outlet passages respectively, a common outlet to which said chambers are connected, each of said chambers having an auxiliary outlet, a pair of filter elements separating said auxiliary outlets from said chambers but permitting unimpeded flow of fluid from the outlet passages to the common outlet, a flow restrictor network interconnecting said auxiliary outlets, and a filtered fluid outlet communicating with said restrictor network, whereby, when the bistable device is in one stable state, a proportion of the fluid flowing into one chamber is tapped off from said auxiliary outlet and flows partially to the other chamber and partially to said filtered fluid outlet, and when the bistable device is in its other stable state a proportion of the fluid flowing through the other chamber is tapped off and flows partially to said one chamber and partially to said filtered fluid outlet, so that both filter elements are cleaned periodically and a continuous supply of filtered fluid is available at the filtered fluid outlet.

2. An apparatus as claimed in claim 1 in which said restrictor network comprises a pair of restrictors in series between said auxiliary outlets, and a third flow restrictor communicating with the junction of said pair of restrictors.

3. An apparatus as claimed in claim 2 which includes a plenum chamber in series between said restrictor network and said filtered fluid chamber.

4. An apparatus as claimed in claim 1 which includes a plenum chamber in series between said restrictor network and said filtered fluid chamber.

* * * * *